(12) United States Patent
Mohler

(10) Patent No.: US 8,489,442 B1
(45) Date of Patent: Jul. 16, 2013

(54) INTERFACE FOR MEETING FACILITATION AND COORDINATION, METHOD AND APPARATUS

(75) Inventor: Bridget M. Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 1583 days.

(21) Appl. No.: 10/770,640

(22) Filed: Feb. 2, 2004

(51) Int. Cl.
*G06Q 10/00* (2012.01)

(52) U.S. Cl.
USPC .......................................... 705/7.13; 705/7.12

(58) Field of Classification Search
USPC ................................................ 702/7.12, 7.13
See application file for complete search history.

(56) References Cited

U.S. PATENT DOCUMENTS

| | | |
|---|---|---|
| 4,819,191 A | 4/1989 | Scully et al. |
| 4,831,552 A | 5/1989 | Scully et al. |
| 5,050,077 A | 9/1991 | Vincent |
| 5,124,912 A | 6/1992 | Hotaling et al. |
| 5,197,000 A | 3/1993 | Vincent |
| 5,206,903 A | 4/1993 | Kohler et al. |
| 5,216,603 A | 6/1993 | Flores et al. |
| 5,323,314 A | 6/1994 | Baber et al. |
| 5,428,784 A | 6/1995 | Cahill, Jr. |
| 5,555,346 A | 9/1996 | Gross et al. |
| 5,619,555 A | 4/1997 | Fenton et al. |
| 5,627,978 A | 5/1997 | Altom et al. |
| 5,774,867 A * | 6/1998 | Fitzpatrick et al. .......... 705/7.19 |
| 5,793,365 A | 8/1998 | Tang et al. .................... 345/329 |
| 5,813,013 A | 9/1998 | Shakib et al. |
| 5,828,747 A | 10/1998 | Fisher et al. |
| 5,889,945 A | 3/1999 | Porter et al. |
| 5,893,073 A | 4/1999 | Kasso et al. |
| 5,905,793 A | 5/1999 | Flockhart et al. |
| 5,920,701 A | 7/1999 | Miller et al. |
| 5,960,406 A * | 9/1999 | Rasansky et al. ................. 705/9 |
| 5,963,913 A | 10/1999 | Henneuse et al. |
| 5,982,873 A | 11/1999 | Flockhart et al. |
| 6,064,976 A | 5/2000 | Tolopka |
| 6,085,166 A | 7/2000 | Beckhardt et al. |
| 6,101,480 A | 8/2000 | Conmy et al. |
| 6,147,685 A | 11/2000 | Bliss et al. |

(Continued)

FOREIGN PATENT DOCUMENTS

| | | |
|---|---|---|
| EP | 1014286 | 6/2000 |
| EP | 1 560 138 | 8/2005 |
| WO | WO 2005/010715 | 2/2005 |

OTHER PUBLICATIONS

Step-By-Step Manual, Microsoft Outlook, Online Training Solutions, Inc. (2004) (Manual appears in 3 parts. It is too bulky to e-file in a single document.).

(Continued)

*Primary Examiner* — Thomas L Mansfield, Jr.
(74) *Attorney, Agent, or Firm* — Sheridan Ross P.C.

(57) ABSTRACT

The present invention is directed to an overlay interface for facilitating and coordinating meetings. In particular, a central overlay interface tool having access to a plurality of applications is provided for scheduling meetings at dates and times at which desired meeting attendees are available. The tool allows for communications related to the meeting to be automatically generated and sent to participants. In addition, communications may be received and acted on by the tool. The tool may also provide for the identification of materials related to the meeting, and provide access to such materials to attendees. In a further aspect, the overlay interface allows for follow-up and sidebar meetings to be scheduled.

20 Claims, 11 Drawing Sheets

U.S. PATENT DOCUMENTS

| | | | |
|---|---|---|---|
| 6,163,607 | A | 12/2000 | Bogart et al. |
| 6,173,053 | B1 | 1/2001 | Bogart et al. |
| 6,192,111 | B1 | 2/2001 | Wu |
| 6,192,122 | B1 | 2/2001 | Flockhart et al. |
| 6,272,074 | B1 | 8/2001 | Winner |
| 6,360,217 | B1 | 3/2002 | Gopal et al. |
| 6,363,352 | B1 * | 3/2002 | Dailey et al. .............. 705/9 |
| 6,377,965 | B1 | 4/2002 | Hachamovitch et al. |
| 6,434,571 | B1 | 8/2002 | Nolte |
| 6,570,555 | B1 | 5/2003 | Prevost et al. |
| 6,594,637 | B1 | 7/2003 | Furukawa et al. |
| 6,640,230 | B1 | 10/2003 | Alexander et al. |
| 6,662,309 | B2 | 12/2003 | Ando et al. |
| 6,675,356 | B1 | 1/2004 | Adler et al. |
| 6,694,335 | B1 | 2/2004 | Hopmann et al. |
| 6,731,323 | B2 | 5/2004 | Doss et al. |
| 6,988,128 | B1 | 1/2006 | Alexander et al. |
| 7,007,235 | B1 | 2/2006 | Hussein et al. |
| 7,012,627 | B1 | 3/2006 | Estrada |
| 7,016,909 | B2 | 3/2006 | Chan et al. |
| 7,027,995 | B2 | 4/2006 | Kaufman et al. |
| 7,035,865 | B2 | 4/2006 | Doss et al. |
| 7,082,402 | B2 | 7/2006 | Conmy et al. |
| 7,113,797 | B2 | 9/2006 | Kelley et al. |
| 7,130,885 | B2 | 10/2006 | Chandra et al. |
| 7,149,810 | B1 | 12/2006 | Miller et al. |
| 7,155,435 | B1 | 12/2006 | Day et al. |
| 7,187,384 | B2 | 3/2007 | Noyle |
| 7,188,073 | B1 * | 3/2007 | Tam et al. .............. 705/9 |
| 7,254,569 | B2 | 8/2007 | Goodman et al. |
| 7,334,000 | B2 | 2/2008 | Chhatrapati et al. |
| 7,343,312 | B2 | 3/2008 | Capek et al. |
| 7,343,313 | B2 | 3/2008 | Dorenbosch et al. |
| 7,346,654 | B1 | 3/2008 | Weiss |
| 7,353,466 | B2 | 4/2008 | Crane et al. |
| 7,363,590 | B2 | 4/2008 | Kerr et al. |
| 7,383,291 | B2 | 6/2008 | Guiheneuf et al. |
| 7,383,303 | B1 | 6/2008 | Bort |
| 7,395,221 | B2 | 7/2008 | Doss et al. |
| 7,436,654 | B2 * | 10/2008 | Cho .............. 361/679.27 |
| 7,440,961 | B1 | 10/2008 | Matousek |
| 7,519,672 | B2 | 4/2009 | Boss et al. |
| 7,530,021 | B2 | 5/2009 | Cheng et al. |
| 7,595,717 | B2 | 9/2009 | Boss et al. |
| 7,693,734 | B2 | 4/2010 | Christenson et al. |
| 7,747,572 | B2 | 6/2010 | Scott et al. |
| 2001/0054072 | A1 | 12/2001 | Discolo et al. |
| 2002/0085701 | A1 | 7/2002 | Parsons et al. |
| 2002/0117847 | A1 | 8/2002 | Ede et al. |
| 2002/0120600 | A1 | 8/2002 | Schiavone et al. |
| 2002/0144136 | A1 | 10/2002 | Stornetta et al. |
| 2003/0046304 | A1 | 3/2003 | Peskin et al. |
| 2003/0069880 | A1 | 4/2003 | Harrison et al. |
| 2003/0149606 | A1 | 8/2003 | Cragun et al. |
| 2003/0154293 | A1 | 8/2003 | Zmolek |
| 2003/0163537 | A1 | 8/2003 | Rohall et al. |
| 2004/0054726 | A1 | 3/2004 | Doss et al. |
| 2004/0128181 | A1 * | 7/2004 | Zurko et al. .............. 705/9 |
| 2004/0168133 | A1 | 8/2004 | Wynn et al. |
| 2004/0192857 | A1 | 9/2004 | Borer et al. |
| 2004/0194110 | A1 * | 9/2004 | McKee et al. .............. 719/310 |
| 2004/0199663 | A1 | 10/2004 | Horvitz et al. |
| 2004/0254998 | A1 | 12/2004 | Horvitz |
| 2005/0069099 | A1 | 3/2005 | Kozdon et al. |
| 2005/0125246 | A1 | 6/2005 | Muller et al. |
| 2005/0125248 | A1 | 6/2005 | Butterworth et al. |
| 2005/0165631 | A1 | 7/2005 | Horvitz |
| 2005/0171818 | A1 | 8/2005 | McLaughlin |
| 2005/0192857 | A1 | 9/2005 | Levine |
| 2005/0198144 | A1 | 9/2005 | Kraenzel et al. |
| 2006/0004843 | A1 | 1/2006 | Tafoya et al. |
| 2006/0020889 | A1 | 1/2006 | Coppinger et al. |
| 2006/0031326 | A1 | 2/2006 | Ovenden |
| 2006/0031470 | A1 | 2/2006 | Chen et al. |
| 2006/0047557 | A1 | 3/2006 | Bieselin et al. |
| 2006/0069686 | A1 | 3/2006 | Beyda et al. |
| 2006/0184584 | A1 | 8/2006 | Dunn et al. |
| 2006/0190485 | A1 | 8/2006 | Adams et al. |
| 2006/0212330 | A1 | 9/2006 | Savilampi |
| 2006/0242109 | A1 | 10/2006 | Pereira et al. |
| 2007/0016878 | A1 | 1/2007 | Forlenza et al. |
| 2007/0118415 | A1 | 5/2007 | Chen et al. |
| 2007/0174104 | A1 | 7/2007 | O'Sullivan et al. |
| 2007/0265903 | A1 | 11/2007 | Blair et al. |
| 2008/0005685 | A1 | 1/2008 | Drews et al. |
| 2008/0034425 | A1 | 2/2008 | Overcash et al. |
| 2008/0037733 | A1 | 2/2008 | Chen et al. |

OTHER PUBLICATIONS http://www.effectivemeetings.com (SMART Technologies, Inc., May 2003).
http://en.wikipedia.org/wiki/Microsoft Outlook; printed Mar. 14, 2006; 4 pages.
http://www.bcentral.co.uk/products/microsoft-outlook.mspx; printed Mar. 14, 2006; 2 pages.
U.S. Appl. No. 11/350,050, filed Feb. 7, 2006, Atkins et al.
U.S. Appl. No. 11/488,487, filed Jul. 17, 2006, Atkins et al.
U.S. Appl. No. 11/554,442, filed Oct. 30, 2006, Atkins et al.
U.S. Appl. No. 11/554,478, filed Oct. 30, 2006, Atkins et al.
U.S. Appl. No. 11/554,497, filed Oct. 30, 2006, Chu et al.
U.S. Appl. No. 11/619,145, filed Jan. 2, 2007, Atkins et al.
U.S. Appl. No. 11/669,707, filed Jan. 31, 2007, Blair et al.
Clayton, Brad "Microsoft Outlook 2003 Enhancements", modified Apr. 19, 2004, Purdue University, 4 pages.
Avaya Case Study (Advertising Agency Uses Avaya Unified Messenger to Streamline Communications, 2003 Avaya Inc.), 2 pages.
U.S. Appl. No. 12/570,933, filed Sep. 30, 2009, Mohler.
Avaya Press Release (Avaya Introduces IBM Lotus Domino Version of Its Market-Leading Unified Messaging Software, http://www.avaya.com/usa/Error404.aspx?currentpath=master-usa/en-us/corporate/pressroom/pressreleases/2003/pr-03,1/27/2003), 4 pages.
Avaya Unified Messenger Client User Guide (2002 Avaya Inc.)
Avaya Web Pages (Retrieved Archive.org from Jun. 13, 2004), 167 pages.
Avaya Unified Messenger Solution—Microsoft Exange 2000 version Installation Guide (2002 Avaya Inc.) 164 pages.
Avaya Unified Messenger Solution—Microsoft Exange Version, 2000 version (2002 Avaya Inc), 8 pages.
Official Action for U.S. Appl. No. 12/570,933, mailed Mar. 1, 2012, 13 pages.
Raider, "Make Address Book Smart Groups auto-complete in mail," MacOsHints.com, contributed Jun. 29, 2005, pp. 1-4.
"Products: Groove Virtual Office," groove.com, 2005, retrieved Mar. 11, 2011, http://replay.waybackmachine.org/2005041 901 0213/http:/www.groove.netiindex.cfm/pagenamelVirtualOffice/, 2 pages.
"Competitive analysis of collaboration tools," http://www.hcii.cmu.edu/M-HCI/2004/sun/competition.htm, 2004, retrieved Mar. 11, 2011, 6 pages.
Boyce, "Microsoft Office Outlook 2003 Inside Out," Nov. 5, 2003, Microsoft Press, Chapter 2.
Official Action for U.S. Appl. No. 12/570,933, mailed Sep. 26, 2012 17 pages.
"Meetings in America", MCI Conferencing, available at http://e-meetings.mci.com/meetingsinamerica/uswhitepaper.php3, website updated Aug. 19, 2003, pp. 1-12.
"TTY Brochure Feb. 2006", http://72.14.203.104/search?q=cache:O3tW0eQtbTEF:ods.utk.edu/brochures/TTYBrochureFebruary2006.pdf+%22teletypewrite . . . (Feb. 2006) 3 page.
"WebAccess Client User Guide" Novell GroupWise 6.5, Oct. 31, 2005, 68 pages.
AIM Acronym Dictionary, http://www.aim.com/acronyms.adp (Jan. 16, 2007) 7 pages.
AIM Bots, http://developer.aim.com/botMain.jsp (2006) 2 pages.
AIM Buddy Info, http://buddyinfo.aim.com/ (2006) 2 pages.
AIM Presence Services, http://developer.aim.com/presenceMain.jsp (2006) 2 pages.
Arthur M. Rosenberg and David A. Zimmer, "Beyond VoIP: Enterprise Perspectives on Migrating to Multi-Modal Communications and Wireless Mobility", (Oct. 2004) 38 pages.

Avaya by Example; Three-Week Wonder: Avaya Unified Communication Center Speech Access Gives Road Warriors 15 Additional Days Each Year, Avaya, Inc. (2005) 3 page.

Boyce, "Microsoft Office Outlook 2003 Inside Out," Nov. 5, 2003, Microsoft Press, Chapters 1, 19, 20.

Chapters 4, 5 and 7 from Microsoft® Office Outlook® 2003; "Step by Step"; Online Training Solutions, Inc.

Dey et al., CybreMinder: A Context-Aware System for Supporting Reminders, Handheld and Ubiquitous Computing: Second International Symposium, HUC 2000, Bristol, UK, Sep. 2000. Proceedings, Jul. 31, 2003, 15 pages, vol. 1927/2000, Springer Berlin/Heidelberg.

"FreeBusy—Microsoft Outlook email autoresponder" http://freebusy.4team.biz/; printed May 24, 2006; 4 pages.

Rob Kassel, "How Speech Recognition Works", http://www.microsoft.com/speech/docs/How_Speech_Works_Article.htm (Nov. 30, 2004) 4 pages.

Yin "[Design] linking and grouping items", available at http://lists.osafoundation.org/pipermail/design/2005-August/003159.html Aug. 1, 2005, pp. 1-2.

Background of the Invention for the above-captioned application (previously provided).

"Avaya™ Unified Communication Center (UCC) Speech Access Solution", Avaya, Inc. (2002), 4 pages.

Arthur M. Rosenberg and David A. Zimmer, "Migrating to Enterprise-Wide Communications: The Branch Office Dilemma", May 2003, 14 pages.

Ivtta Turin 98, "The Linguistic Components of The REWARD Dialogue Creation Environment and Run Time System", http://cpk.auc.dk/~tb/articles/ivtta98.htm (Sep. 1998) 13 pages.

"How to Use a TTY", NETAC Teacher Tipsheet, htt://72.14.203.104/search?q=cache:JdktLkxPgMUJ: www.netac.rit.edu/downloads/TPSHT_TTY.pdf+%22teletypewriter%22+ . . . (1999) 4 pages.

Tony Vitale, "Hardware and Software Aspects of a Speech Synthesizer Developed for Persons With Disabilities", http://codi.buffalo.edu/archives/computing/.dec.speech (1993).

Dave Anderson and George McNeill, "Artificial Neural Networks Technology", http://www.dacs.dtic.mil/techs/dacs_reports/text/neural_nets.txt (Aug. 20, 1992) 145 pages.

Avantgo: AvantGo launches new release of Pylon products; AvantGo Pylon 5.1 offers new support for Domino 6, Palm OS 5 and custom repeating meetings M2 Presswire. Coventry: Jan. 24, 2003. p. 1-4.

"Special Edition Using Lotus Notes and Domino 5" (Published by Que, Aug. 23, 1999, ISBN 0-7897-1814-6.

"Windows Client User Guide" (Novell Groupwise 7.0, Mar. 14, 2008, copyright 2005-2008) discloses Groupwise 7.0 (released Aug. 15, 2005), 389 pages.

* cited by examiner

INTERFACE FOR MEETING FACILITATION AND COORDINATION, METHOD AND APPARATUS

FIELD OF THE INVENTION

The present invention is related to facilitating and coordinating meetings. In particular, the present invention is directed to an overlay interface for facilitating and coordinating meetings electronically.

BACKGROUND OF THE INVENTION

Meetings between persons are often required to advance a cooperative enterprise or reach a concensus. According to effective meetings.com (SMART Technologies, Inc., May 2003), over 11,000,000 meetings occur each day. The scheduling of such meetings is complicated where there are a large number of participants, or where participants are located in different time zones. In addition, supplying supporting materials to meeting participants, and doing so in a convenient format, can be a challenging task. Furthermore, during a meeting it is often desirable to take meeting notes, and assign action items to various meeting attendees. In addition, sidebar meetings are often desirable. Subsequent or secondary discussions may also be spawned. The process of manually scheduling meetings and follow-up meetings, distributing documents and other materials to meeting attendees, and taking meeting notes is tedious, time-consuming and inefficient. Accordingly, meetings and associated activities are extremely costly to businesses.

In a typical enterprise, the process of scheduling a meeting between participants often involves numerous communications between attendees in order to determine an acceptable time and agenda. For example, a significant amount of inefficient e-mail, facsimiles and voice mails may be required. Additional rounds of such communications may also be generated in connection with scheduling follow-up meetings and sidebar discussions.

Scheduling tools exist to facilitate the setting of meeting times and places. However, such applications are incapable of automatically resolving conflicts that may arise due to prospective meeting attendees being located in different time zones. Accordingly, such programs are of little assistance in setting meetings that will be attended by at least some of the attendees remotely, such as through video or teleconferencing. In addition, such programs do not provide for the creation of meeting notes during the meeting, the distribution of meeting materials, or convenient scheduling of subsequent or sidebar meetings.

Application programs that allow multiple users to participate in the creation of textual documents have been developed. However, such applications do not provide scheduling functions that can be used to schedule meetings, subsequent meetings, or sidebar discussions. In addition, such applications typically allow access to only one document at a time, and do not provide for the delivery of materials to meeting attendees.

Other application programs that have been developed to facilitate meetings include programs for scheduling resources, such as conference rooms. Although such applications provide a central location at which reservations for shared resources can be made, they do not provide for scheduling of meeting attendees, the distribution of meeting materials, or other functions.

Still other applications have been developed for facilitating meetings in which all or some of the participants are remote from one another. For example, online meeting and conferencing tools have been developed to facilitate communications between participants over a communication network. However, such applications do not provide a convenient interface for determining the identity of an attendee requesting speaking time. Furthermore, where multiple attendees have requested speaking time, the order in which such attendees are granted speaking time is determined by a meeting leader, rather than automatically. In addition, scheduling subsequent meetings or sidebar discussions, as well as access to textual and other materials, requires the use of separate applications and/or communications channels accessed outside of the context of the online meeting tool. Conventional on-line meeting tools also do not provide a facility for taking meeting minutes, and therefore such activities must also be done outside of the context of the online meeting tool.

Accordingly, it would be desirable to provide a single application capable of performing multiple functions in connection with the scheduling and conduction of meetings. Furthermore, it would be desirable to provide a single application that could be used to automatically schedule meeting attendees, distribute materials to the attendees, allow for the entry of contemporaneous notes or minutes taken during a meeting, and facilitate the scheduling and conduction of subsequent or sidebar meetings.

SUMMARY OF THE INVENTION

The present invention is directed to solving these and other problems and disadvantages of the prior art. According to the present invention, an application overlay or overlay interface is provided that functions as a gateway to a plurality of applications. In accordance with an embodiment of the present invention, the overall interface allows a user to automate repetitive functions, including the scheduling of meetings. Because the overlay interface functions as a gateway to legacy applications, and not as a replacement application, legacy applications and systems do not need to be replaced in order for the present invention to be deployed. Furthermore, because the overlay interface provides convenient access to legacy applications, it is not necessary for a user learn how to use new tools in order to use various provided functions.

In accordance with an embodiment of the present invention, the overlay interface accesses electronic data related to the schedules of potential meeting attendees, to determine potential meeting times. In accordance with a further embodiment of the present invention, where meeting attendees are located in different time zones, such time zones are considered in order to prevent the scheduling of meetings outside of normal or reasonable business hours.

In accordance with another embodiment of the present invention, an overlay interface that displays the identity of persons presently attending a meeting in progress and identifying an attendee currently speaking is provided. Furthermore, such an embodiment may allow action items to be assigned, and subsequent or sidebar meetings to be established. In accordance with still another embodiment of the present invention, an overlay interface that allows access to meeting materials is provided. According to still another embodiment of the present invention, the overlay interface allows a scribe to enter meeting minutes and notes associated with a meeting in progress.

Additional features and advantages of the present invention will become more readily apparent from the following discussion, particularly when taken together with the accompanying drawings.

DETAILED DESCRIPTION

Figure 1:
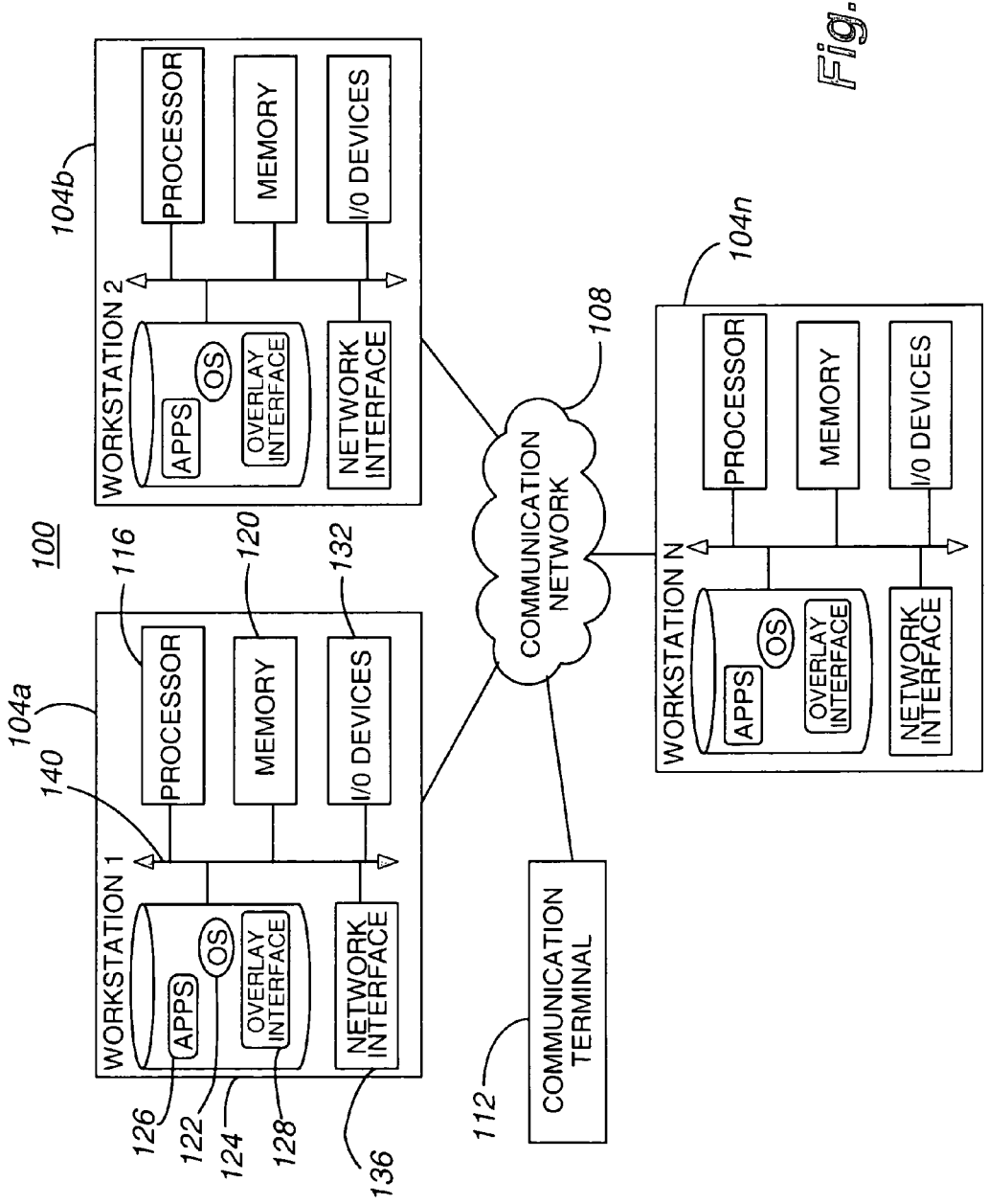
FIG. 1 is a block diagram of a communication arrangement in accordance with an embodiment of the present invention.

The present invention is directed to facilitating and coordinating meetings. With reference now to FIG. 1, a communication arrangement 100 such as may be used in connection with an application overlay in accordance with an embodiment of the present invention is illustrated. As shown in FIG. 1, the communication arrangement 100 may include a number of workstations 104 that are each interconnected to and in communication with one another over a communication network 108. Although three workstations 104a, 104b and 104n are illustrated in FIG. 1, it should be appreciated that any number of workstations 104 may be included in the communication arrangement 100. In addition, the communication arrangement 100 may include one or more communication terminals 112. Each communication terminal 112 may be in communication with one or more workstations 104, and/or one or more other communication terminals 112, via the communication network 108.

In general, each workstation 104 may comprise a general purpose computer or an intelligent communication device. Accordingly, each workstation 104 may include a general purpose programmable processor or controller 116 for executing application programming. In addition, memory 120 may be provided for use in connection with the execution of the application programming, and for the temporary or long-term storage of data. A data store 124 may also be provided for storing operating system 122, application 126, and/or overlay interface 128 programming and/or data. Various input/output devices 132 may also be provided. For example, in connection with a workstation 104 implementing an intelligent communication device, the input/output devices 132 may include one or more microphones and speakers, to allow a user or users at a location corresponding to a workstation 104 to participate in voice communications with a user or users at a location associated with another workstation 104 or communication terminal 112. In addition, the input/output devices 132 may include a visual display device, for displaying information associated with the operation of the overlay interface 128, and for displaying related meeting materials, including scheduling information, applicant availability information, and meeting materials. One or more keyboards and/or pointing devices may additionally be provided as input/output devices 132 to allow for the entry of data and selection of displayed items. A network interface 136 may also be provided for interconnecting a workstation 104 to the communication network 108. A communication bus 140 is provided to permit the exchange of data between various components of each workstation 104. Although each workstation 104 is illustrated in FIG. 1 as including each of the described components, it should be appreciated that the workstations 104 are not required to have the illustrated set of components. Furthermore, in a communication arrangement having one or more workstations 104, each workstation is not required to include a copy of an overlay interface 128 application in accordance with the present invention. For example, in accordance with an embodiment of the present invention, the overlay interface 128 may be installed on one workstation 104, and loaded onto one or more additional workstations 104 as desired to provide overlay interface functions 128 on those additional workstations 104. In accordance with another embodiment, the overlay interface 128 may be installed on and/or active on less than all of the workstations in a communication arrangement 100. For example, the overlay interface 128 may be active on only one workstation 104.

The communication network 108 may comprise one or more networks capable of carrying data, including real-time data, between workstations 104, or between at least one workstation and one or more communication terminals 112. Accordingly, the communication network 108 may comprise a computer network, including a local area network (LAN), a wide area network (WAN), a private intranet, or the Internet. In addition, the communication network 108 may comprise a public switched telephone network or wireless communication network.

A communication terminal 112 may be supported by embodiments of the present invention, for example to allow participation by meeting attendees who do not have access to a workstation 104. Accordingly, a communication terminal 112 may comprise a conventional telephone. In accordance with another embodiment of the present invention, a communication terminal 112 may comprise a computer enabling communications between a user associated with the communication terminal 112 and other users, at least one of which is associated with a workstation 104, that does not provide overly interface 128 functionality. Accordingly, not every workstation 104 in a communication arrangement 100 having a number of workstations is required to provide overlay interface 128 functionality. In addition, a communication terminal 112 may be used in conjunction with a workstation 104. For example, a communication terminal 112 comprising a conventional telephone or videophone may be used for voice communications in combination with a workstation 104 that provides overlay interface 128 functionality but does not directly support voice communications.

Figure 2:
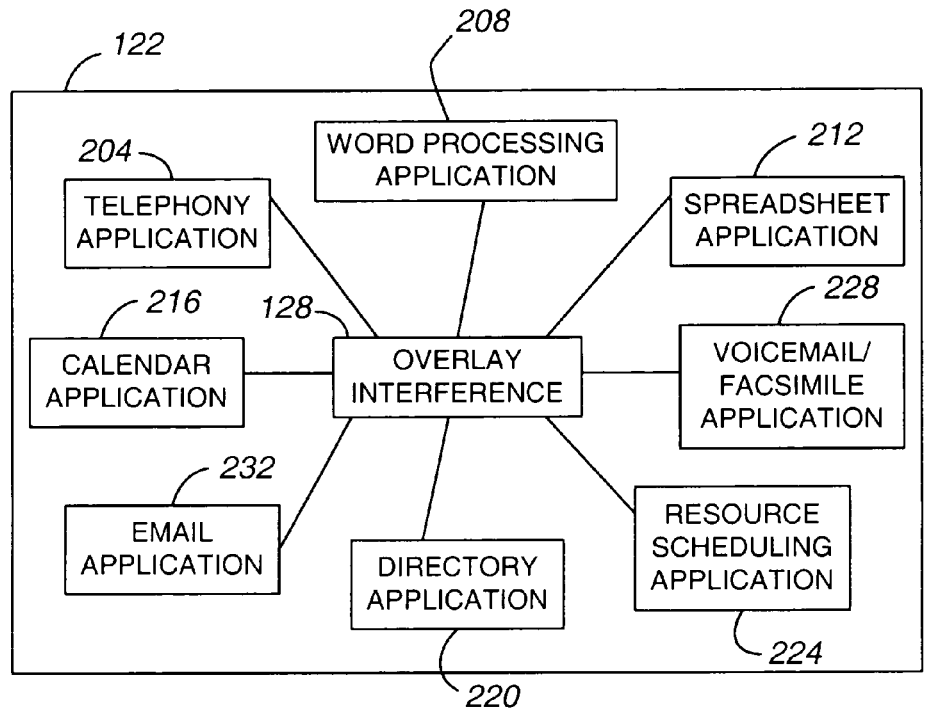
FIG. 2 is a block diagram of a relationship between applications in accordance with an embodiment of the present invention.

With reference now to FIG. 2, an example of possible relationships between an overlay interface or interface application 128 and associated processes or applications (e.g., applications 126) that may be accessed through an overlay interface 128 is illustrated. As can be appreciated by one of skill in the art, the interface application 128 and other workstation applications 126 generally run on or operate in connection with an operating system 122. Although the application 126 and interface application 128 are depicted in FIG. 2 as running on a single operating system 122, it should be appreciated that the present invention is not so limited. For example, different applications 126 and/or copies of the overlay interface 128 may run on different copies of an operating system or different workstations 124 or servers accessible to the workstations, for example over the communication network 108, and/or on different operating system 122 versions and types.

Examples of associated processes or applications, which may include applications 126 on a workstation with an overlay interface 128, include electronic communication processes or applications, such as a telephony application 204. The telephony application 204 may support the exchange of voice and/or video data between users associated with a workstation 104 at a first location and a workstation 104 or electronic communication terminal 112 at a second location. Examples of other communication applications that may be associated with an overlay interface 128 in accordance with an embodiment of the present invention include chat and instant messaging applications.

In addition, the interface application 128 may support an interconnection to or provide access to a data process, such as a word processing application 208. For example, the overlay interface 128 may provide access to a word processing application 208 through a window, so that data may be retrieved from or added to documents in real-time, while a meeting is underway, or during pre or post meeting activities, while having a view of and/or immediate access to other information associated with the meeting through the overlay interface 128. The overlay interface 128 may also include or provide connectivity to other data processes, such as a spreadsheet application 212 to allow for information to be entered into or accessed from spreadsheet documents in real-time while a meeting is in progress, or during pre or post meeting activities, while simultaneously displaying and/or providing access to other meeting related information via the overlay interface 128. Still other examples of data processes that may be accessed through the overlay interface include presentation or slide show applications.

Interconnectivity to a scheduling tool or electronic calendar application 216 is provided to allow for the automatic scheduling of meeting attendees. In particular, through the overlay interface 128, an administrator or meeting organizer may poll calendar data associated with selected meeting attendees to determine the availability of such persons. In addition, once a date and time for the meeting has been selected, the selected date and time can be automatically entered into the calendars of each meeting attendee.

Access to a directory application 220 may be provided to facilitate the selection of meeting attendees. In particular, a directory application 220 associated with a business enterprise may allow the meeting organizer to select appropriate attendees based on title or responsibility information included in the directory application 220. In addition, information regarding whether potential meeting attendees remain affiliated with the business enterprise can be obtained through the directory application 220.

The overlay interface 128 may also provide interconnectivity to a resource scheduling application 224. Accordingly, required resources, such as conference rooms, workstations 104, projectors, or other resources for use in connection with a scheduled meeting may be reserved through the overlay interface 128.

In addition, the overlay interface 128 may provide interconnections to voice mail/facsimile 228 and email 232 applications. For example, the meeting organizer may publish or announce the scheduling of a meeting or other information to meeting participants through the overlay interface 128 in association with a facsimile application 228 and/or email application 232. As used herein, voice mail/facsimile 228 and/or email 232 applications may be considered to be types of electronic communication processes or applications.

In summary, the overlay interface 128 allows a user to access and utilize various processes or applications 126 (e.g., applications 204-232) through the overlay interface 128. Accordingly, by opening a single application (the overlay interface 128) directly, a user may benefit from the features provided by a number of applications. Furthermore the overlay interface 128 may enhance the convenience of such applications 126 by providing a central store of information, such as a list of selected meeting attendees, which can be used to automatically query the applications 126 for relevant information, and to automate the exchange of correspondence and information with respect to a particular meeting or family of meetings, as will be described in greater detail elsewhere herein.

Figure 3:
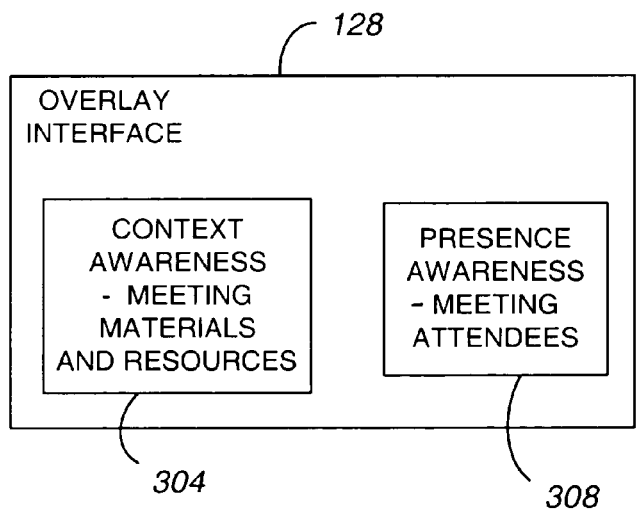
FIG. 3 is a block diagram illustrating functional aspects of an interface application in accordance with an embodiment of the present invention.

With reference now to FIG. 3, certain functional aspects of an overlay interface 128 in accordance with an embodiment of the present invention are illustrated. In particular, the overlay interface 128 includes context awareness 304 with respect to meeting materials, and presence awareness 308 with respect to meeting attendees.

Context awareness 304 may include an awareness of materials and resources associated with a particular meeting or family of meetings. For example, the context awareness function 304 of an overlay interface 128 may allow documents or other materials related to a scheduled meeting to be conveniently available to all meeting attendees having access to a work station 104. As a particular example, if the text of a document is being discussed, a meeting attendee may select from a menu that includes as an item that document in order to view the text while it is being discussed. Accordingly, by populating selectable items of an overlay interface 128 with related materials, access to such materials may be facilitated.

The presence awareness functions 308 of an overlay interface 128 may facilitate the tracking of the persons actually in attendance in real-time. For instance, the presence awareness function 308 may track attendees as they log into or out of the meeting. Such information may be displayed, for example continuously, on work stations 104. The presence awareness functions 308 of the overlay interface 128 additionally allow for the convenient assignment and/or scheduling of peripheral tasks. For example, a number of attendees may be assigned to a submeeting, or subsequent meeting, for example by the meeting organizer or a delegate, through the overlay interface 128.

Figure 4:
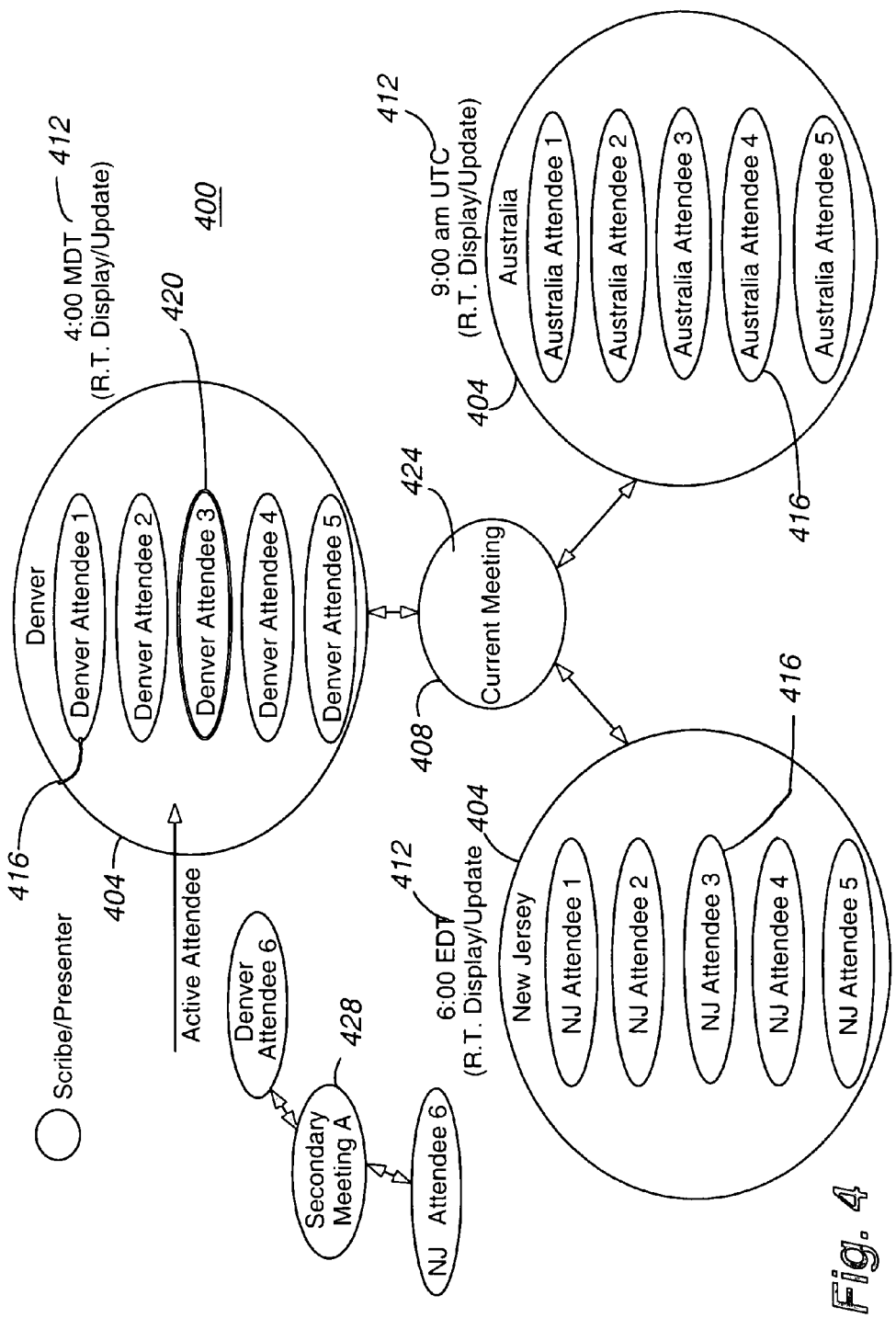
FIG. 4 depicts an overlay interface display in accordance with an embodiment of the present invention.

With reference now to FIG. 4, an example of a meeting space 400 in accordance with an embodiment of the present invention is illustrated. In addition FIG. 4 is an example of information that may be displayed by an overlay interface 128 in accordance with an embodiment of the present invention. As depicted in FIG. 4, the meeting space 400 may include representations of locations 404 associated with attendees of the active meeting 408. In addition, the local time 412 at each location 404 may be displayed, and updated in real-time. Attendees 416 that have signed into the meeting 408 are associated with their respective location 404. In the exemplary embodiment of the FIG. 4, the attendees are listed by their location and an assigned number. However, each attendee 416 would typically be listed by name. Alternatively or in addition, each attendee 416 signed into the meeting may be listed by a descriptive title. The active attendee 420 may be graphically indicated, for example by color coding. The active attendee 420 is the attendee speaking or otherwise adding content at a particular moment in time. Accordingly, the indication of the active attendee is updated in real-time or near real-time. In addition, a graphical indication may be associated with an attendee who has made a request to speak or otherwise add content. Where a number of attendees have made requests to add content, and those requests have not been fulfilled, the order in which the requests were made may determine the order in which each requesting attendee is allowed to add content. The order in which the requests will be granted may be indicated graphically or in other ways, such as by displaying a number corresponding to the requestor's position in a queue of requesters.

The current meeting 408 may include a description 424, allowing for a particular meeting to be conveniently identified, such as by title or topic. In addition, by providing a description 424, a meeting space 400 for each of a number of meetings may be displayed. The display of multiple meetings can facilitate the tracking of the participation of attendees 416 in the main meeting, or sidebar or secondary meetings. Thus, if input from a particular attendee is desired in connection with a particular secondary meeting, the presenter or delegate may assign that attendee 416 to the secondary meeting requiring that person's input. Secondary meetings may also be identified and optionally displayed in the meeting space 400. For instance, in the example illustrated in FIG. 4, Denver Attendee 6 and New Jersey Attendee 6 have been assigned to secondary meeting A 428.

As can be appreciated, a display of the meeting space 400 thus allows meeting attendees 416 to be easily identified. Furthermore, the graphical display may be manipulated by the presenter or a delegate, for example to create submeetings by clicking on attendees 416 to be assigned to such submeeting, or to recall attendees 416 previously assigned to a submeeting to a main meeting. For instance, the assignment of attendees to a secondary meeting may be performed graphically, for example by drawing links between the attendee 416 being assigned to a secondary meeting using an input/output device 132 comprising a pointing device.

Figure 5A:
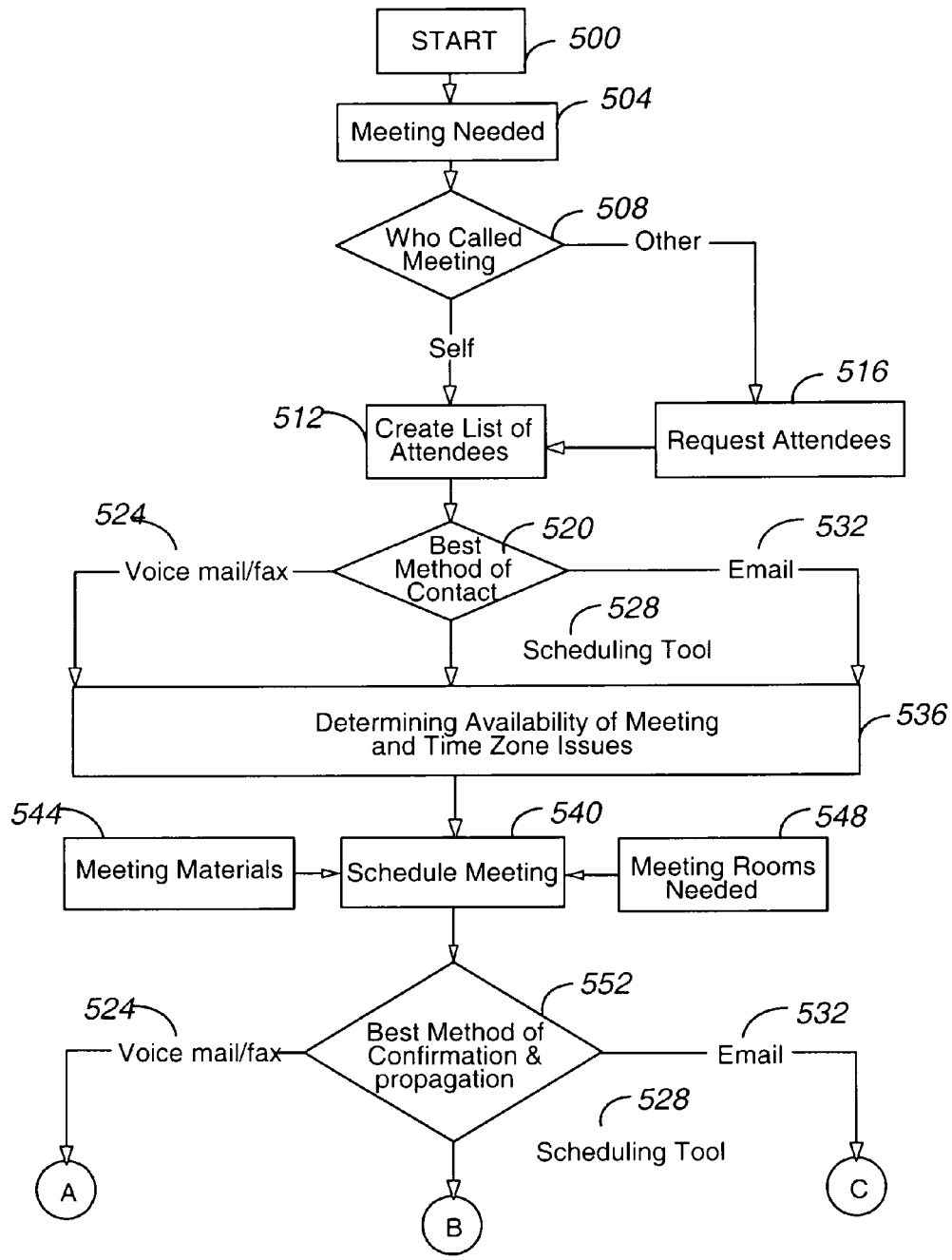
FIG. 5A is a flowchart depicting aspects of a process flow associated with an overlay interface in accordance with an embodiment of the present invention.

With reference now to FIG. 5A, a process for facilitating and coordinating a meeting in accordance with an embodiment of the present invention is illustrated. Initially, at step 500, the process is started. For example, a user may open an overlay interface 128 application. At step 504, a determination that a meeting is needed is made. This determination may be made by the present user, or some other person. At step 508, a determination is made as to who called the meeting under consideration. If the current user called the meeting, that user next creates a list of attendees (step 512). If at step 508 it is determined that some other person called the meeting, the current list of attendees is provided to the user (step 516). The process may then continue to step 512, at which point the current user may edit the list of attendees, if desired, and/or if permission to edit the list has been granted to the user.

At step 520, the best method of contact for each of the attendees is determined. Examples of contact methods include voice mail or fax 524, a scheduling tool 528, such as any electronic calendar, or email 532. After determining the best method of contact 520, each of the listed meeting attendees is contacted to determine their availability (step 536). In particular, the overlay interface 128 will utilize the facilities of a scheduling tool application 216 to check the calendar of a listed attendee for those attendees whose best method of contact is a scheduling tool 528, or to notify a listed attendee whose best method of contact is voice mail or fax 524 or email 532 of proposed meeting dates and times using a voice mail/facsimile application 228 or email application 232. As part of determining the availability of listed attendees, time zone issues are considered, to avoid scheduling a meeting outside of normal or reasonable business hours for any listed attendee. In accordance with an embodiment of the present invention, a listed attendee's availability can be determined automatically by accessing a scheduling tool 528 containing data associated with that attendee. For an attendee who does not maintain an electronic calendar using a scheduling tool 528, or for whom an alternate method of contact has been selected or determined to be preferable, the attendee's availability may be determined through an exchange of communications for example, in proposing a meeting date and time or requesting information regarding available dates and times, and receiving a reply from the attendee. Such an exchange of communications may be performed automatically through the overlay interface 128. For example, the application interface 128 may generate and send a request for availability information to a listed attendee via email 532 using an automated form that can be completed by the receiving attendee.

After information regarding the availability of listed attendees has been collected, the meeting is scheduled (step 540). For example, dates and times at which all or a substantial portion of the meeting attendees are available may be presented to the user, and the user may then make a selection from the list. In addition, scheduling the meeting 540 may include determining the meeting materials 544 that are to be available in connection with the meeting, and meeting facilities or resources, such as meeting rooms, teleconferencing, or projection equipment 548 needed in connection with the meeting.

The best method of confirming and propagating notice of the scheduled meeting is then determined for each attendee (step 552). Accordingly, methods of contact, such as voice mail or fax 524, electronic scheduling tools 528 or email 532 may be used to notify the attendees available during the selected meeting time of the meeting. Furthermore, multiple methods of confirmation and propagation may be used in connection with a single attendee. The confirmation and propagation messages may be generated automatically for each available attendee by the overlay interface 128, and delivered in connection with the appropriate application 126. The best method of confirmation and propagation for a particular available attendee may be the same as the best method of contact used to determine that attendee's availability at step 520, or it may be different.

With reference now to FIG. 513, at step 556, the meeting, meeting location or locations and materials associated with the meeting are confirmed. Confirmation may include a reply communication from each of the available attendees. The overlay interface 128 may manage the confirmations received from the attendees. For example, the confirmation status of attendees may be available to users of the overlay interface 128 in various levels of detail. For example, a summary of the number of available attendees notified of the meeting who have confirmed and the number who have not yet confirmed may be displayed. In addition, information regarding the confirmation status of each individual attendee notified of the meeting may be made available to a user of the overlay interface 128.

Figure 5B:
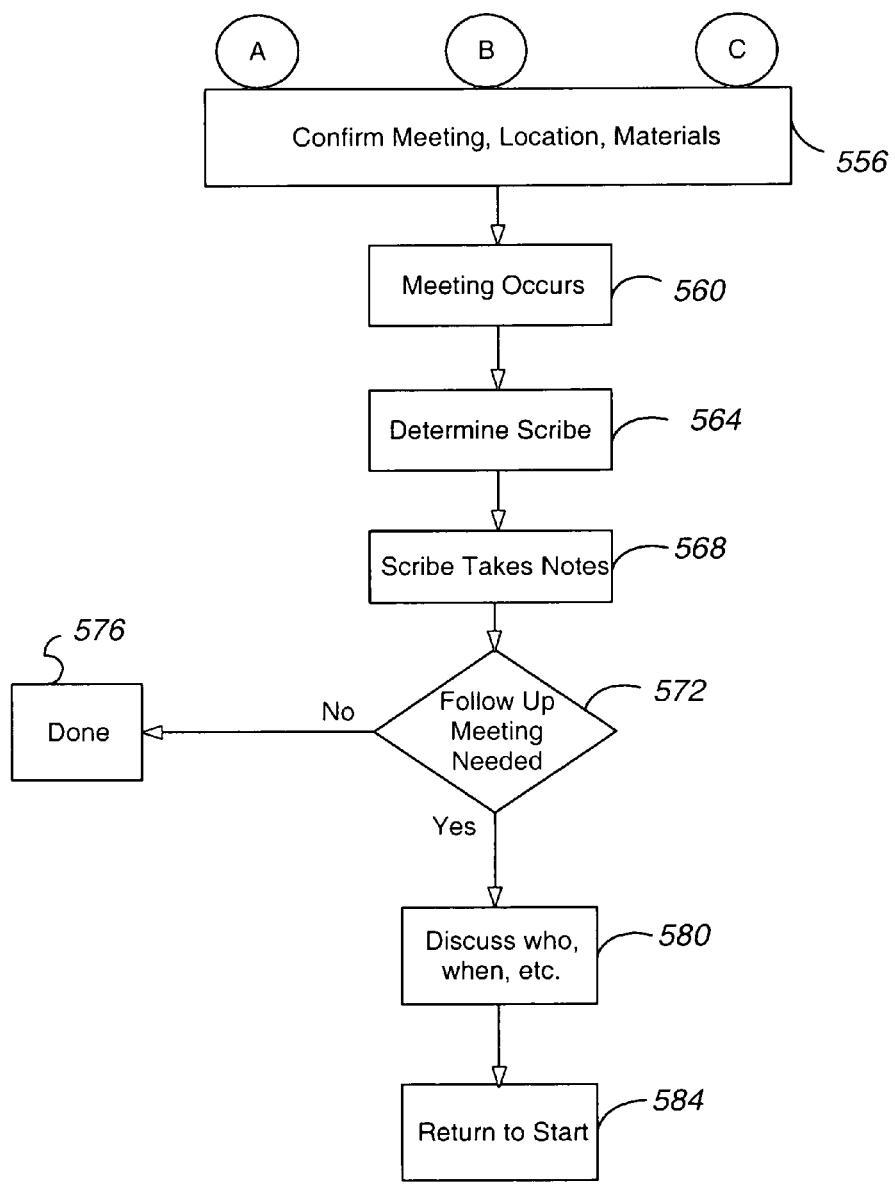
FIG. 5B is a flowchart depicting additional aspects of a process flow associated with an overlay interface in accordance with an embodiment of the present invention.

At step 560, the meeting occurs. The meeting itself may be held between attendees in a single location. Alternatively, one or more of the attendees may be located at one or more remote locations, in which case at least a portion of the meeting is conducted as a tele or video conference, or otherwise using real-time communications. In addition, a scribe may be determined for the meeting (step 564). As depicted in FIG. 5B, the step of determining the scribe 564 may be performed after the meeting has been started. Alternatively, the scribe may be determined before the meeting commences. During the meeting, the appointed scribe takes notes (step 568) from which the meeting minutes may be compiled.

During or at the conclusion of the meeting, a determination is made as to whether a follow-up meeting is needed (step 572): If it is determined that a follow-up meeting is not needed, and provided that the current meeting is over, then the process ends (step 576). If it is determined that a follow-up meeting is needed, the meeting attendees may discuss who should attend the follow-up meeting, the topic of the meeting, how soon the meeting should be scheduled, documents or other materials required for that meeting, and other matters (step 580). The process may then return to the start (step 584) and the follow-up meeting can be scheduled in the same manner as the original meeting.

Figure 6:
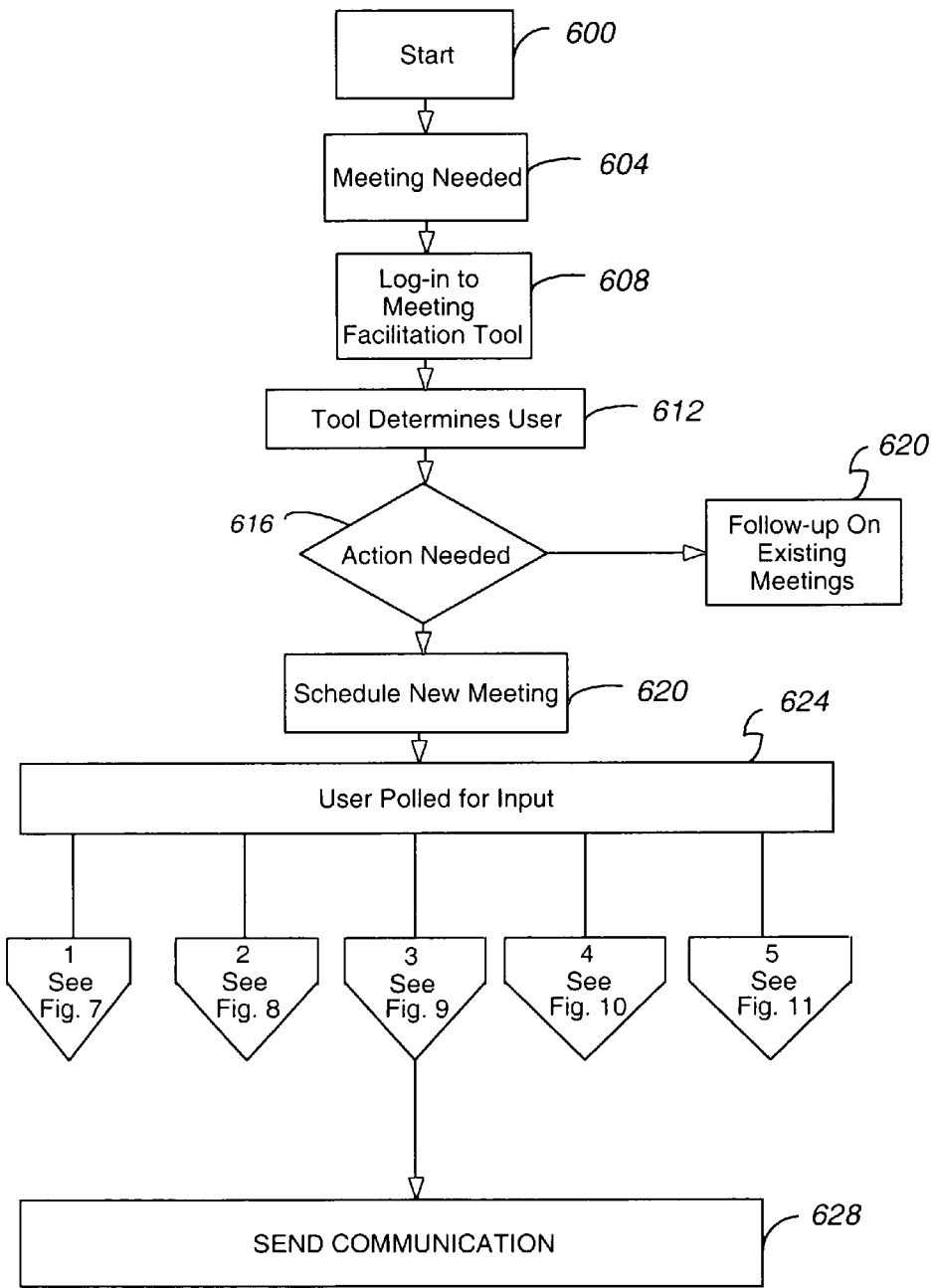
FIG. 6 is a flowchart illustrating an overview steps taken in connection with scheduling a meeting using an overlay interface in accordance with an embodiment of the present invention.

With reference now to FIG. 6, an overview of the operation of an overlay interface 128 in accordance with an embodiment of the present invention is illustrated. Initially, following the process start (step 600) a determination is made that a meeting is needed (step 604). The user or person setting up the meeting may then log into the meeting facilitation tool or overlay interface 128 (step 608). The tool may then determine the user (step 612). In accordance with an embodiment of the present invention, the access that a user has information maintained by the overlay interface 128 is controlled depending on the identity of the user.

At step 616, a determination is made that action is needed. If the action required is to perform follow-up on an existing or previously scheduled meeting (step 620) the overlay interface 128 may allow the user to access lists of meeting attendees, meeting dates and times, and meeting materials. For example, a user may use the overlay interface 128 to access meeting materials associated with a particular meeting, and edit those materials. In addition, the user may also use the overlay interface 128 to edit other aspects of an existing meeting, such as to schedule the date and time, meeting attendees, and meeting location or locations.

If the action needed involves scheduling a new meeting (step 620) the overlay interface 128 polls the user for input (step 624). Examples of such input are given in connection with FIGS. 7-11 and the accompanying description. After the user has entered the necessary input, which typically includes desired meeting attendees, materials needed for the meeting, the subject of the meeting and required confidentiality level, preferred meeting dates, and required resources, a communication notifying the selected meeting attendees of the meeting is sent (step 628).

Figure 7:
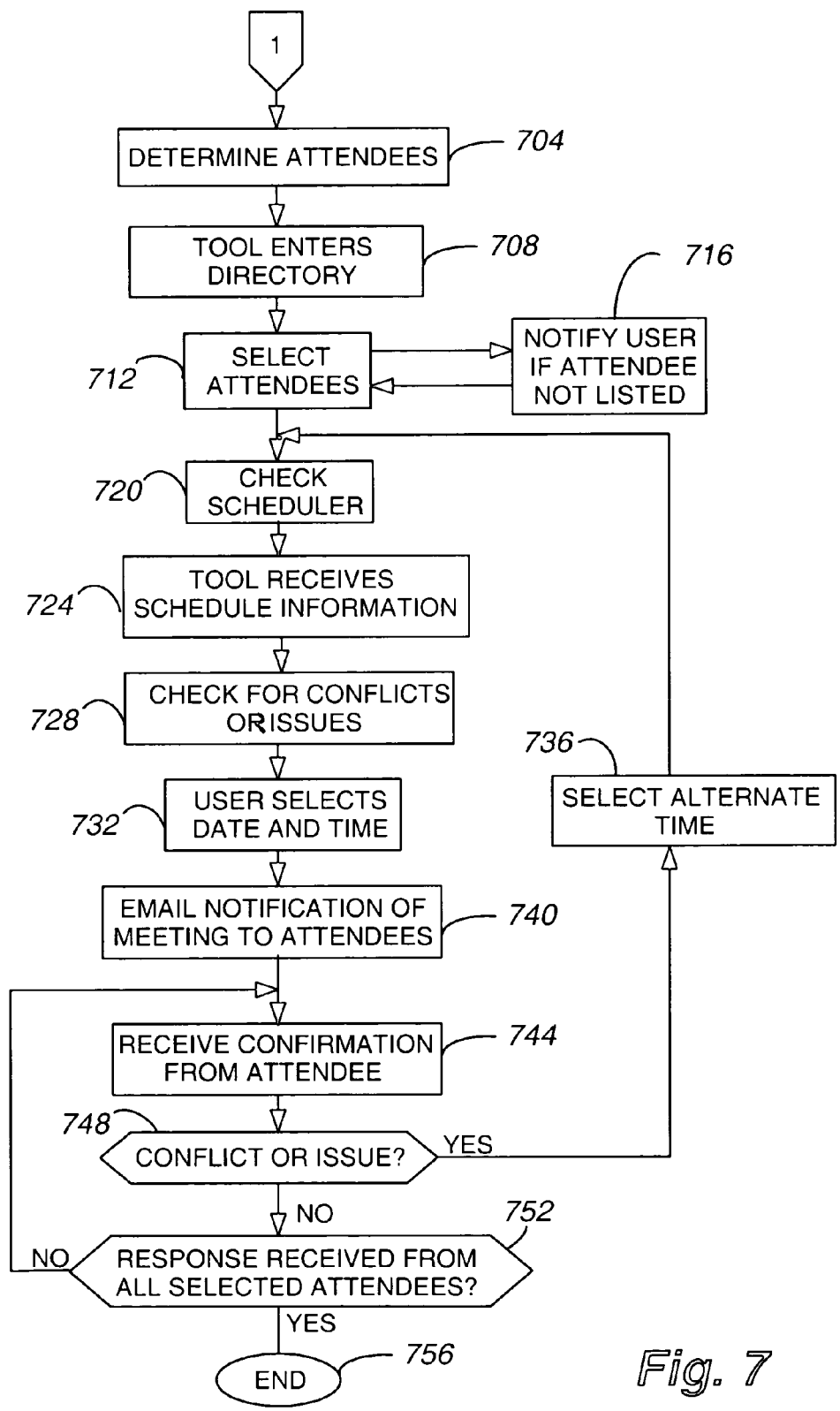
FIG. 7 is a flowchart illustrating the scheduling of attendees in accordance with an embodiment of the present invention.

With reference now to FIG. 7, steps taken in connection with polling the user for input regarding meeting attendees are illustrated. Initially, at step 704, the user determines the attendees for the meeting being scheduled. Using the selection of the attendees entered by the user, the overlay interface 128 enters a company directory to obtain information regarding the attendees (step 708). The company directory may comprise a directory of company employees. In addition, the company directory or another directory accessible by the overlay interface 128 may comprise a directory of outside service providers. At step 712, the meeting attendees are selected from the directory. If a selected attendee is not included in the directory, the user or coordinator is notified (step 716). For example, if a prospective attendee has been removed from a company directory, it may indicate that the person is no longer an employee of the company. Accordingly, the user will know the prospective attendee is not available and/or to select an alternate employee. In addition, the overlay interface 128 will therefore indicate that the attendee is no longer available. The process of selecting attendees and notifying the user if a selected attendee is not included in a directory continues until the user is satisfied with the list of selected attendees that are also included in the directory.

A scheduler application is then checked for each of the selected attendees (step 720), and the overlay interface tool 128 receives the selected attendees' schedule information (step 724). Accordingly, in the example illustrated in FIG. 7, each of the selected attendees is assumed to maintain an electronic calendar using a calendar application 216 that can be accessed by the overlay interface 128. In accordance with an embodiment of the present invention, the scheduler need not be the same for each of the selected attendees. For example, each selected attendee may use a different calendar application 216, provided it can be accessed by the overlay interface 128. In accordance with a further embodiment of the present invention, if a selected attendee does not maintain an electronic calendar, or otherwise does not have associated data in a scheduler accessible to the overlay interface 128, the process may proceed using an assumed availability for such an attendee. The overlay interface 128 may then check for conflicts or issues, such as time zone or holiday related issues particular to each attendee's locale, or expected location (step 728). Applying the data from the scheduler, a meeting date and time is selected by the user (step 732), and the attendees are then provided with an e-mail notification of the scheduled meeting (step 740). Accordingly, the embodiment of the overlay interface 128 illustrated in FIG. 7 assumes that each of the attendees can be contacted by email. According to another embodiment of the present invention, attendees may be contacted using alternate forms of communication.

At step 744, a confirmation message is received from an attendee. A determination is then made as to whether the confirmation received presents a conflict or issue (step 748). For example, an attendee may notify the coordinator, through a reply email that is received by the overlay interface 128, that they have a conflict that was not entered in the scheduler application. If there is a conflict or issue, an alternate date and time may be selected (step 736). If the confirmation does not present a conflict or issue, a determination is made as to whether a response has been received from all of the selected attendees (step 752). If a response has not been received from all of the selected attendees, the process returns to step 744 to await the receipt of the next confirmation message. If a response has been received from all of the selected attendees, the process ends (step 756). In accordance with another embodiment of the present invention, the process of setting a meeting time and date does not require confirmation from meeting attendees. According to such an embodiment, the process of scheduling a meeting may end after a notification of the attendees of the scheduled date and time.

Figure 8:
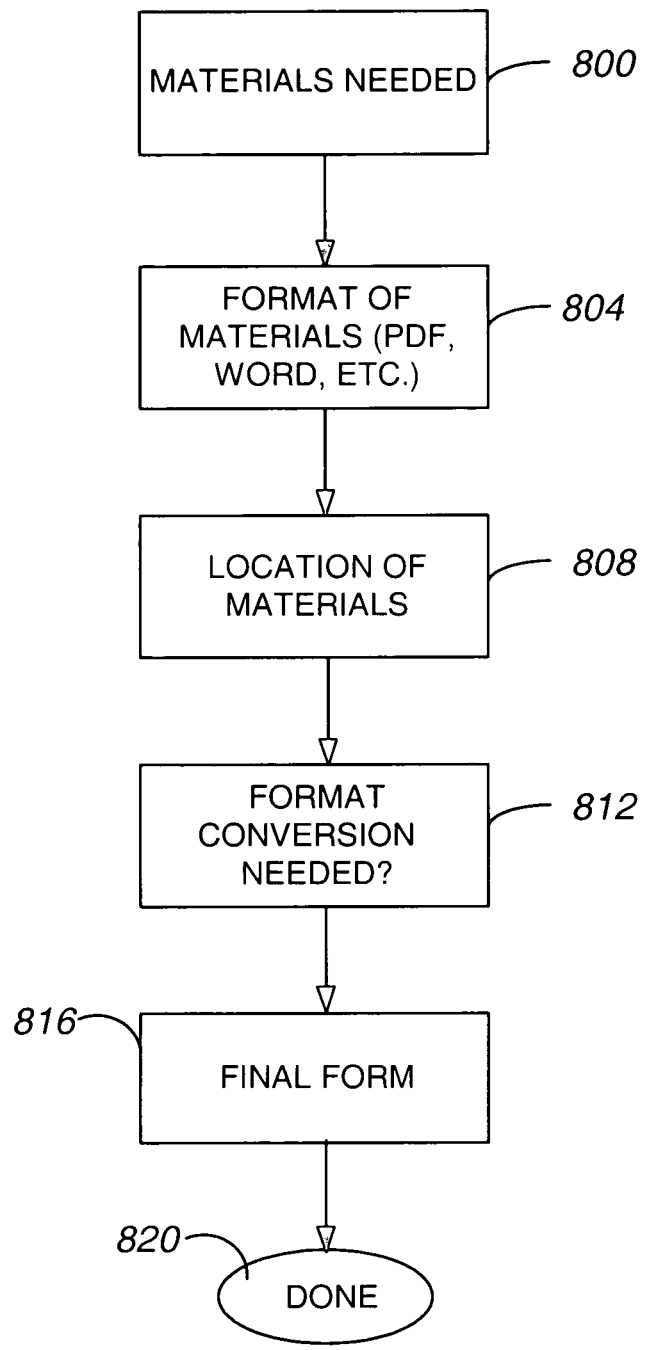
FIG. 8 is a flowchart illustrating the selection and formatting of meeting materials in accordance with an embodiment of the present invention.

With reference now to FIG. 8, a process for selecting and formatting materials needed in connection with a meeting is illustrated. Initially, at step 800, the materials needed in connection with a meeting are identified. Such materials may include, for example, textual documents, graphics, and data.

At step 804, the format of the materials needed for the meeting is identified. For example, documents may be in .pdf, .doc, .wpd, .ppt, .xls, .xlt, .html, or other formats. As part of the process of identifying materials, the location of those material is also identified (step 808). Furthermore, if identified materials are not located on a storage device accessible through the computer network 108 used in connection with the workstation or workstations 104 on which the overlay interface 128 is running, any such materials may be moved or otherwise collected. The step of locating materials may also include establishing links between those materials and the overlay interface 128. At step 812 any needed format conversions are performed. In particular, documents having formats not supported by workstations 104 used by meeting attendees will require conversion. At step 816, documents requiring conversion are placed in their final format. The process then ends (step 820).

Figure 9:
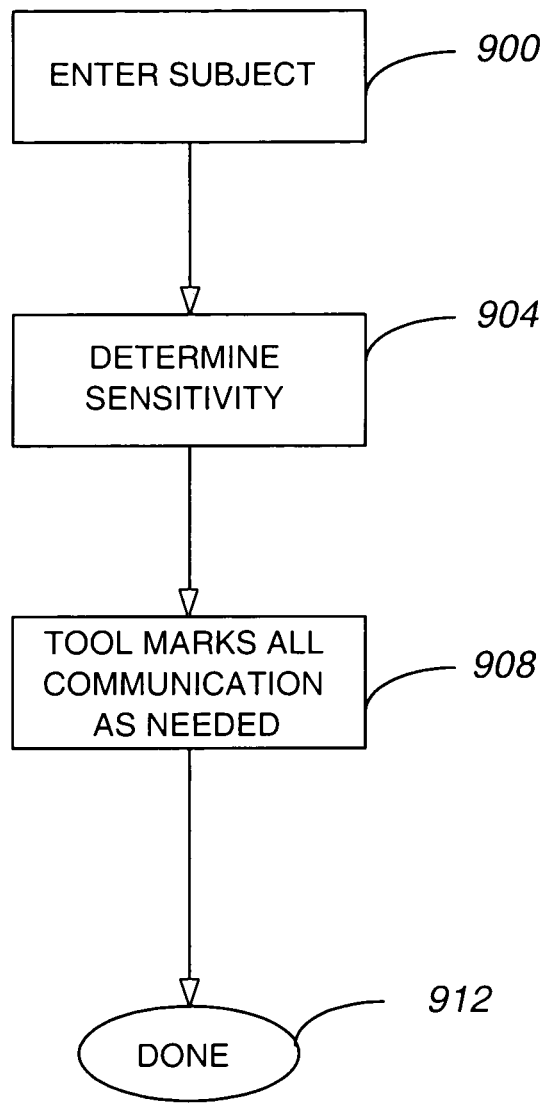
FIG. 9 is a flowchart illustrating the establishment of a confidentiality level for communications associated with a meeting in accordance with an embodiment of the present invention.

With reference now to FIG. 9, a process for establishing a confidentiality level with respect to materials and/or communications related to a meeting in accordance with an embodiment of the present invention is illustrated. Initially, at step 900, the subject of the meeting is entered. For example, the subject of the meeting may be identified by a code word or other method of categorization. In addition, the sensitivity of the meeting may be determined (step 904). At step 908, the overlay interface 128 marks all communications and/or documents as required by the confidentiality level indicated by the subject and sensitivity associated with the meeting. The process of assigning a confidentiality level may then end (step 912). Accordingly, an embodiment of the present invention allows a confidentiality level to be automatically assigned to communications and documents associated with a meeting. Furthermore, the overlay interface 128 may implement or require an appropriate level of security to the associated communications or materials. For example, the overlay interface 128 may automatically encrypt communications and/or materials before such communications and/or materials are transmitted between workstations 104.

Figure 10:
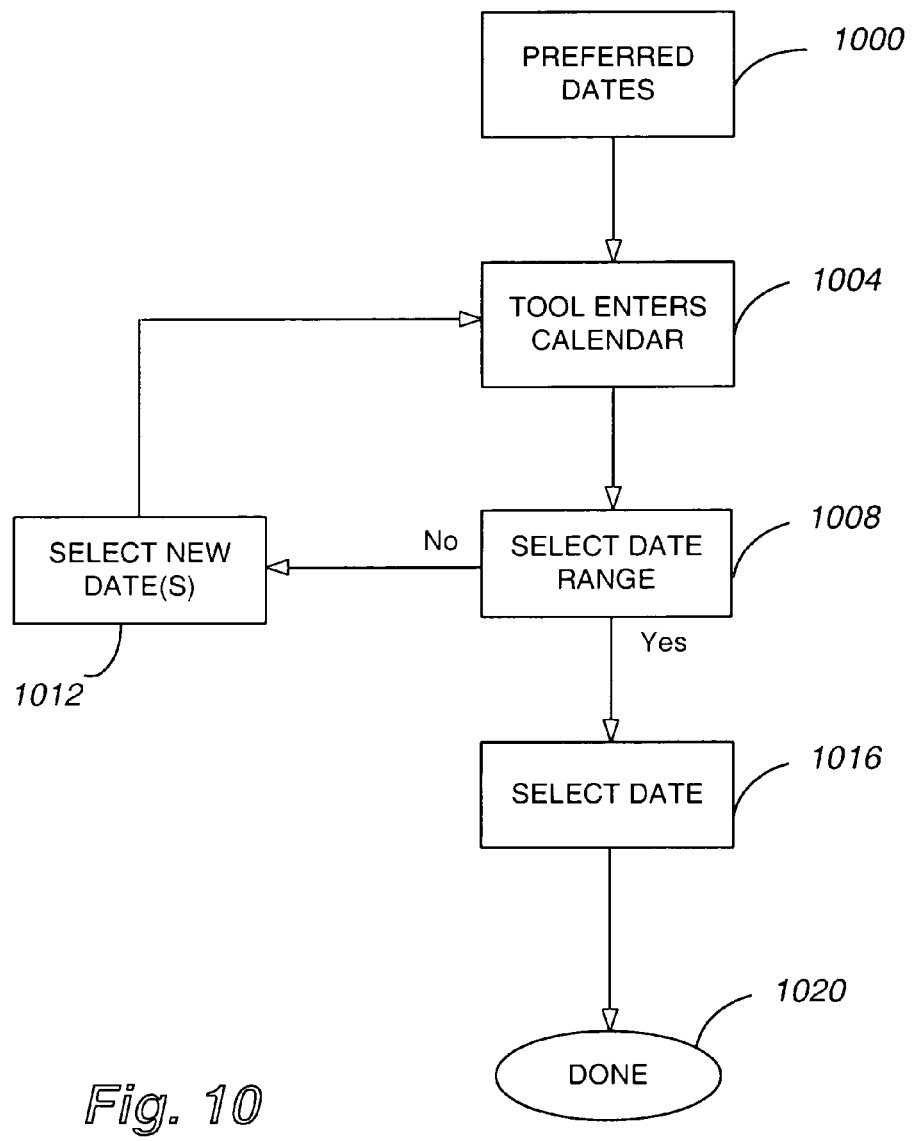
FIG. 10 is a flowchart illustrating the selection of a meeting date in accordance with an embodiment of the present invention.

With reference now to FIG. 10, a method for selecting a meeting date and time in accordance with an embodiment of the present invention is illustrated. Initially, at step 1000, the user enters one or more preferred dates and times into the overlay interface 128. At step 1004, the overlay interface enters the calendars or schedulers 216 associated with the meeting attendees or prospective attendees. A date and time range available for the meeting corresponding to the preferred dates are presented to the user (step 1008). If the user determines that none of the dates and times are now acceptable, one or more new dates and times may be selected (step 1012), in which case the tool again checks the calendars at step 1004. If a date and time within the returned range is acceptable, the user selects one of the dates and times (step 1016) and the process ends (step 1020).

Figure 11:
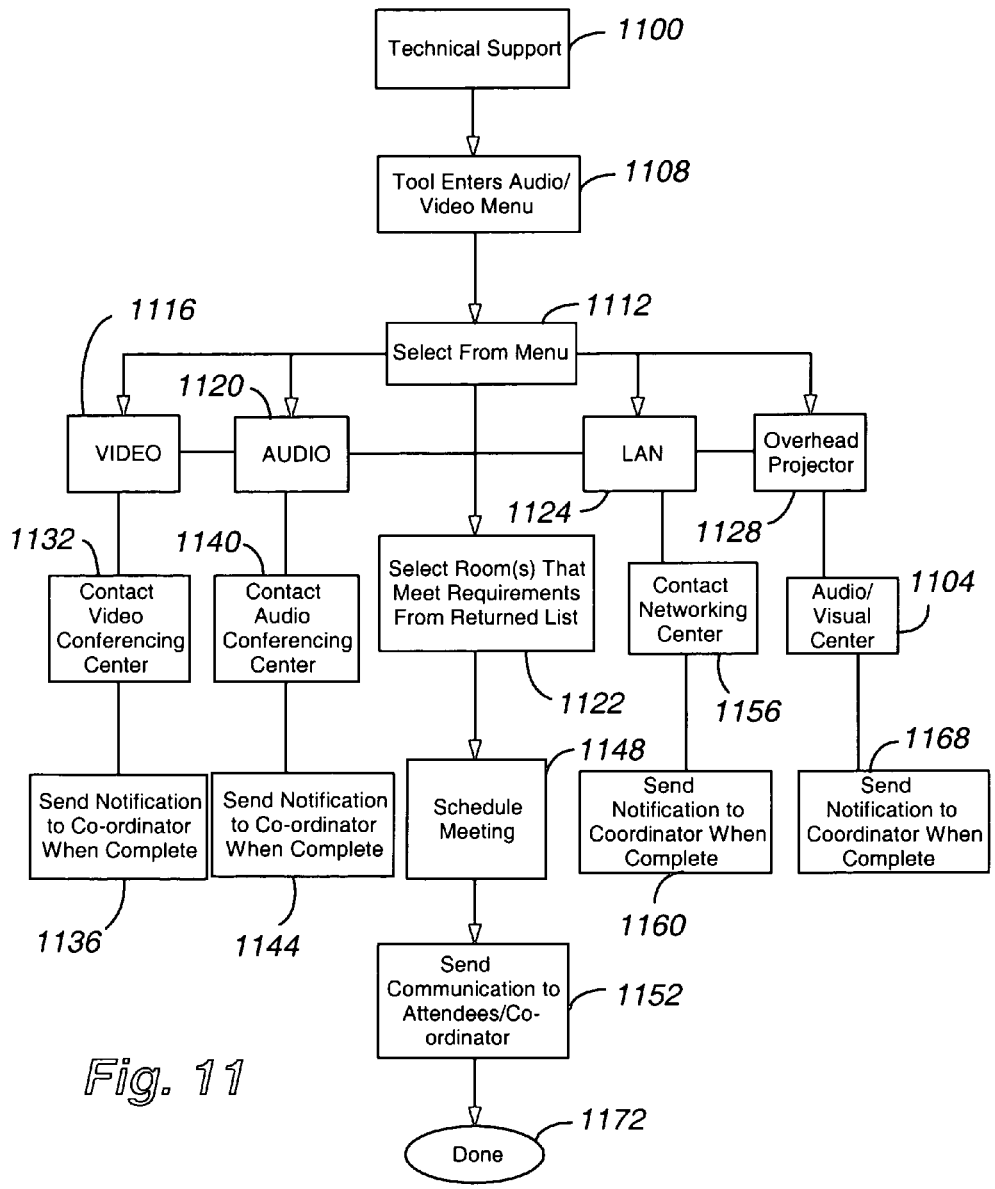
FIG. 11 is a flowchart illustrating the scheduling of resources for use in connection with a meeting in accordance with an embodiment of the present invention.

With reference now to FIG. 11, a process for determining and reserving required resources in connection with a meeting is illustrated. In general, the process may include using the overlay interface 128 to access one or more resource scheduling applications 224. Initially, at step 1100, any required technical support, such as workstations 104 or other equipment, such as projectors or specialized conferencing equipment, is identified. The overlay interface 128 then presents a menu to the user (step 1108). The user may then make selections from the menu (step 1112). Examples of equipment that may be selected from the menu include video equipment 1116, audio equipment 1120, a local area network 1124, and an overhead projector 1128.

With respect to video equipment 1116, by making a selection of such equipment, a video conferencing center may be contacted by the overlay interface 128 (step 1132). Through such communication, a reservation or order for the necessary equipment may be made, and confirmation or notification of the availability of such equipment may be sent to the user or coordinator through overlay interface 128 (step 1136).

In connection with the selection of audio equipment at step 1120, the audio conferencing center may be contacted through the overlay interface 128 (step 1140). Through such communication, the necessary audio equipment may be reserved or ordered. Confirmation of the availability of the requested audio equipment may then be sent to the coordinator or user through the overlay interface 128 (step 1144).

The selection of conference rooms at step 1122 allows the user to enter a reservation for a conference room or rooms during or around the scheduled meeting time (step 1148). Confirmation of the reservation of the requested conference room or rooms may then be sent to the user or coordinator through the overlay interface 128 (step 1152).

With respect to a request for a local area network at step 1124, a networking center may be contacted (step 1156). Confirmation of the order for the requested local area network may be sent to the coordinator or user through the overlay interface 128 (step 1160).

With respect to a request for an overhead projector 1128, the overlay interface 128 may generate a communication to an audio-visual center with a request for the overhead projector (step 1164). Confirmation of the reservation of the overhead projector may be sent to the user or coordinator through the overlay interface 128 (step 1168).

After the selection of support equipment or resources, and after confirmation that such support or resources will be made available for the meeting, the process of scheduling support and resources ends (step 1172).

As can be appreciated by one of skill in the art from the description provided herein, an overlay interface in accordance with embodiments of the present invention provides an interface to a number of existing or legacy applications. Accordingly, the overlay interface provides convenient and integrated access to existing tools. In addition to facilitating meeting processes, embodiments of the overlay interface therefore allows various functions and acts using applications that are familiar to a user. Accordingly, a user is not required to learn new tools in order to use various functions provided through the overlay interface.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for scheduling a meeting using an overlay interface, comprising:
   identifying a need for a meeting between a plurality of persons;
   a computer including a processor and memory executing said overlay interface, wherein the computer is a first workstation associated with a user and the overlay interface executes on the first workstation;

said overlay interface determining a list of desired meeting attendees, wherein said determined list of desired meeting attendees is entered into said overlay interface through a user interface of the first workstation;

said overlay interface accessing a first electronic calendar process on the first workstation, wherein the first electronic calendar process is associated with the user;

said overlay interface accessing a second electronic calendar process on a second workstation, the second workstation associated with at least one of the desired meeting attendees, wherein said first electronic calendar process and said second electronic calendar process are disparate calendar applications;

said overlay interface polling the second electronic calendar process associated with the at least one of the desired meeting attendees to obtain desired attendee availability information;

in response to said polling, said overlay interface obtaining at least a first potential meeting date and time;

said overlay interface selecting a potential meeting date and time, wherein said selected potential meeting date and time is entered into said overlay interface through the user interface of the first workstation; and said overlay interface notifying the at least one desired meeting attendee of said selected potential meeting date and time using at least a first electronic communication process, wherein a meeting is scheduled in the second electronic calendar process of one of the at least one desired meeting attendee and the user.

2. The method of claim 1, further comprising:

using a scheduling process accessed through said overlay interface, comparing said desired meeting attendee availability information and from said desired meeting attendee availability information identifying at least a first candidate meeting date and time;

using said scheduling process, checking for at least a first disqualifying issue associated with said at least a first candidate meeting date and time; and in response to failing to find a disqualifying issue associated with said at least a first candidate meeting date and time, said overlay interface placing said at least a first candidate meeting date and time in a potential meeting date and time list, wherein said selecting a potential meeting date and time includes selecting at least one potential meeting date and time from said list.

3. The method of claim 2, wherein said at least a first disqualifying issue includes at least one of the following disqualifications: not during business hours, weekend, holiday, vacation, and previously scheduled issue.

4. The method of claim 1, further comprising:

determining support materials for said scheduled meeting; and establishing a list of said selected materials, wherein said list of selected materials is maintained by said overlay interface, wherein said selected materials comprise at least one of a document, a projector, and a teleconference device.

5. The method of claim 1, further comprising:

using one of said at least a first communication process and a second communication process accessed through said overlay interface, establishing a communication link between each of said desired meeting attendees at or about said scheduled meeting date and time;

receiving an acknowledgement that at least two of said desired attendees are actual attendees; and using an electronic communication process accessed through said overlay interface, exchanging information between said at least two actual attendees.

6. The method of claim 5, further comprising:

determining a need for a subsequent meeting;

determining a list of desired subsequent meeting attendees;

using said second electronic calendar process accessed through said overlay interface, polling a calendar associated with each of said desired attendees;

in response to said polling, obtaining at least a first potential subsequent meeting date and time;

selecting a potential subsequent meeting date and time; and using said electronic communication process accessed through said overlay interface, notifying said desired subsequent meeting attendees of said selected subsequent meeting date and time, wherein a subsequent meeting is scheduled.

7. The method of claim 5, further comprising:

determining a need for a simultaneous sidebar meeting;

determining a list of desired simultaneous sidebar meeting attendees;

using a resource scheduling application accessed through said overlay interface, polling said resource scheduling application for available resources;

in response to said polling, scheduling said sidebar meeting through said overlay interface; and presenting said sidebar meeting and said at least two of said desired attendees that are actual attendees in the meeting in a display at the same time.

8. The method of claim 5, further comprising: using a separate word processing process accessed through said overlay interface, taking meeting minutes during said meeting.

9. The method of claim 5, further comprising: using a data process accessed through said overlay interface, distributing information to said actual attendees.

10. The method of claim 9, further comprising: using said overlay interface, sequencing said information distributed to said actual attendees.

11. The method of claim 9, wherein said data process accessed through said overlay interface comprises at least one of a word processing application, a spreadsheet application, and a presentation application.

12. The method of claim 1, further comprising: displaying data to a meeting attendee using a data process accessed through said overlay interface.

13. The method of claim 12, wherein said data is displayed in a sub-window of said overlay interface.

14. The method of claim 1, further comprising:

determining a need for a specific action by a selected meeting attendee during said meeting;

using a word processing process accessed through said overlay interface, creating a record of said specific action; and using one of said first electronic communication process and a second electronic communication process accessed through said overlay interface, communicating said record of said specific action to at least said selected meeting attend.

15. The method of claim 1, wherein said electronic communication process accessed through said overlay interface comprises at least one of a telephony application, a chat application, an instant messaging application, a voice mail application, a facsimile application and an email application.

16. The method of claim 1, further comprising: using a resource scheduling application accessed through said overlay interface, determining an availability of a resource, wherein said selecting a potential meeting date and time comprises selecting a potential meeting date and time obtained from said polling of said calendar and corresponding to a date and time at which said resource is available.

17. The method of claim 16, wherein said resource scheduling application comprises at least one of a teleconferencing resource and a meeting room resource.

18. A computer readable medium having stored thereon computer-executable instructions, which, when executed by a processor, cause the processor to execute a method for scheduling a meeting using an overlay interface, comprising:
identifying a need for a meeting between a plurality of persons;
said overlay interface determining a list of desired meeting attendees, wherein said determined list of desired meeting attendees is entered into said overlay interface through a user interface of a first workstation;
said overlay interface accessing a first electronic calendar process on the first workstation, wherein the first electronic calendar process is associated with the user;
said overlay interface accessing a second electronic calendar process on a second workstation, the second workstation associated with at least one of the desired meeting attendees, wherein said first electronic calendar process and said second electronic calendar process are disparate calendar applications;
said overlay interface polling the second electronic calendar process associated with at least one of the desired meeting attendees to obtain desired attendee availability information;
in response to said polling, said overlay interface obtaining at least a first potential meeting date and time;
said overlay interface selecting a potential meeting date and time, wherein said selected potential meeting date and time is entered into said overlay interface through a user interface of the first workstation; and
said overlay interface notifying at least one desired meeting attendee of said selected potential meeting date and time using at least a first electronic communication process, wherein a meeting is scheduled in at least one of the second electronic calendar process of the at least one desired meeting attendee and the first electronic calendar process of the user.

19. A first workstation comprising:
a memory operable to store computer-executable instructions;
a processor in communication with the memory, the processor operable to retrieve the computer-executable instructions from the memory and to execute the computer-executable instructions, the computer-executable instructions comprising:
instructions to identify a need for a meeting between a plurality of persons;
instructions to execute an overlay interface;
instructions to determine a list of desired meeting attendees, wherein said determined list of desired meeting attendees is entered into said overlay interface through a user interface of the first workstation;
instructions to access a first electronic calendar process on the first workstation, wherein the first electronic calendar process is associated with a user;
instructions to access a second electronic calendar process on a second workstation, the second workstation associated with at least one of the desired meeting attendees, wherein said first electronic calendar process and said second electronic calendar process are disparate calendar applications;
instructions to poll the second electronic calendar process associated with at least one of the desired meeting attendees to obtain desired attendee availability information;
in response to said polling, instructions to obtain at least a first potential meeting date and time;
instructions to select a potential meeting date and time, wherein said selected potential meeting date and time is entered into said overlay interface through a user interface of the first workstation; and
instructions to notify at least one desired meeting attendee of said selected potential meeting date and time using at least a first electronic communication process, wherein a meeting is scheduled in at least one of the second electronic calendar process of the at least one desired meeting attendee and the first electronic calendar process of the user.

20. The method of claim 5, further comprising:
determining a need for a simultaneous sidebar meeting;
determining a list of desired simultaneous sidebar meeting attendees;
using a resource scheduling application accessed through said overlay interface, polling said resource scheduling application for available resources;
in response to said polling, scheduling said sidebar meeting through said overlay interface;
presenting said sidebar meeting and said at least two of said desired attendees that are actual attendees in the meeting in a display at the same time; and
using a word processing process accessed through said overlay interface, taking meeting minutes during said meeting.

* * * * *